United States Patent
Anderson et al.

(10) Patent No.: US 7,080,804 B2
(45) Date of Patent: Jul. 25, 2006

(54) HOT-START NAVIGATION INFORMATION DISTRIBUTION SYSTEM

(75) Inventors: Donald B. Anderson, Baltimore, MD (US); Richard M. Anthony, Bel Air, MD (US); Long T. Nguyen, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/881,148

(22) Filed: Jun. 30, 2004

(65) Prior Publication Data

US 2005/0029395 A1 Feb. 10, 2005

Related U.S. Application Data

(60) Provisional application No. 60/493,827, filed on Aug. 8, 2003.

(51) Int. Cl.
*F41G 7/00* (2006.01)
*G01C 21/20* (2006.01)
*H04L 9/00* (2006.01)
*H04L 9/28* (2006.01)

(52) U.S. Cl. .................. 244/3.15; 244/3.1; 342/357.01; 342/357.06; 701/200; 701/207; 701/213; 701/215; 380/277; 380/278; 380/44

(58) Field of Classification Search .......... 244/3.1–3.3; 342/357.01–357.17; 701/200, 207, 213–216; 380/277–285, 44–47

See application file for complete search history.

(56) References Cited

U.S. PATENT DOCUMENTS

| | | | | |
|---|---|---|---|---|
| 5,507,452 A | * | 4/1996 | Mayersak | .................. 244/3.15 |
| 5,554,994 A | * | 9/1996 | Schneider | .............. 342/357.06 |
| 5,657,947 A | * | 8/1997 | Mayersak | .................. 244/3.19 |
| 6,237,496 B1 | * | 5/2001 | Abbott | ....................... 244/3.19 |
| 6,254,031 B1 | * | 7/2001 | Mayersak | .................. 244/3.22 |
| 6,573,486 B1 | * | 6/2003 | Ratkovic et al. | ............. 244/3.2 |
| 6,779,752 B1 | * | 8/2004 | Ratkovic | .................. 244/3.15 |
| 6,883,747 B1 | * | 4/2005 | Ratkovic et al. | .......... 244/3.15 |

* cited by examiner

*Primary Examiner*—Bernarr E. Gregory
(74) *Attorney, Agent, or Firm*—DeMont & Breyer, LLC

(57) ABSTRACT

A weapons system is disclosed that provides hot-start navigational information to the Global-Positioning-System receivers on missiles prior to flight. The system comprises a Global-Positioning-System receiver that uses a classified red cryptographic key to decode the P(Y) signal from one or more of the Global-Positioning-System constellation of satellites. Once the P(Y) signal is decoded, one or more characteristics of the P(Y) signal is derived. These characteristics of the signal—and some other information including a black cryptographic key that comprises the red cryptographic key—are then provided to the Global-Positioning-System receivers on missiles prior to flight. By giving the missiles this information, the missiles are able to acquire the P(Y) signals, which enables them to determine their position more quickly than they otherwise could.

24 Claims, 8 Drawing Sheets

HOT-START NAVIGATION INFORMATION DISTRIBUTION SYSTEM

CROSS-REFERENCE TO RELATED APPLICATIONS

This application claims the benefit of U.S. provisional patent application Ser. No. 60/493,827, filed Aug. 8, 2003, entitled "VLS Global-Positioning-System Integrator (VGI) with SAASM," which is also incorporated by reference.

STATEMENT REGARDING FEDERALLY-SPONSORED RESEARCH

This invention was made with Government support under Contracts No. N00024-00-C-5486 and N00024-03-C-6110, awarded by the Department of the Navy. The Government has certain rights in this invention.

FIELD OF THE INVENTION

The present invention relates to weapons systems in general, and, in particular, to an electronics system that provides "hot-start" navigational information to the Global-Positioning-System receivers on missiles prior to flight.

BACKGROUND OF THE INVENTION

Weapons systems in the prior art have provided "hot-start" navigational information to the Global-Positioning-System receivers on missiles prior to flight, but these systems have relied on complex wiring and multiple interfaces to provide the information to the receivers. Therefore, the need exists for an improved weapons system for providing hot-start navigational information to the Global-Positioning-System receivers on missiles prior to flight, without some of the costs and disadvantages in the prior art.

SUMMARY OF THE INVENTION

The present invention enables a weapons system to provide "hot-start" navigational information to the Global-Positioning-System receivers on missiles prior to flight without some of the costs and disadvantages associated with distribution systems in the prior art. Although the illustrative embodiment of the present invention is a weapons system, it will be clear to those skilled in the art, after reading this specification, how to make and use embodiments of the present invention in non-weapons systems, such as civilian navigation systems, time distribution systems, and banking systems.

The illustrative embodiment is a weapons system that comprises a Global-Positioning-System data integrator and distribution system. The Global-Positioning-System data integrator comprises a Global-Positioning-System receiver that uses a classified red cryptographic key to decode the P(Y) signal from one or more Global-Positioning-System satellites. Once the P(Y) signal is decoded, one or more characteristics (e.g., the PRN code synchronization, the Doppler shift, the modulation bit sequence, etc.) of the signal is derived. The "hot start" navigational information comprises these characteristics of the signal—and some other information including a black cryptographic key from which the red cryptographic key is derivable. By giving the "hot start" navigational information to the Global-Positioning-System receivers on the missiles prior to flight, the missiles are able to acquire the P(Y) signals themselves more quickly than they otherwise could, which enables them to determine their position more quickly than they otherwise could.

The illustrative embodiment comprises: a transmitter for transmitting a data stream to j Global-Positioning-System receivers, wherein j is a positive integer greater than 1; and a power supply comprising j output terminals, wherein (i) each of the j output terminals is uniquely connected to one of the j Global-Positioning-System receivers and (ii) each of the j output terminals are energized independently of each other.

DETAILED DESCRIPTION

For the purposes of the disclosure and claims, the term "red cryptographic key" is defined as a string that is used recover a P(Y) signal from a Global-Positioning-System satellite.

For the purposes of the disclosure and claims, the term "black cryptographic key" is defined as an encrypted red cryptographic key.

For the purposes of the disclosure and claims, the term "hot-start navigation information" is defined as any information that could enable or expedite a Global-Positioning-System receiver to acquire or decode the signals from a Global-Positioning-System satellite.

Figure 1:
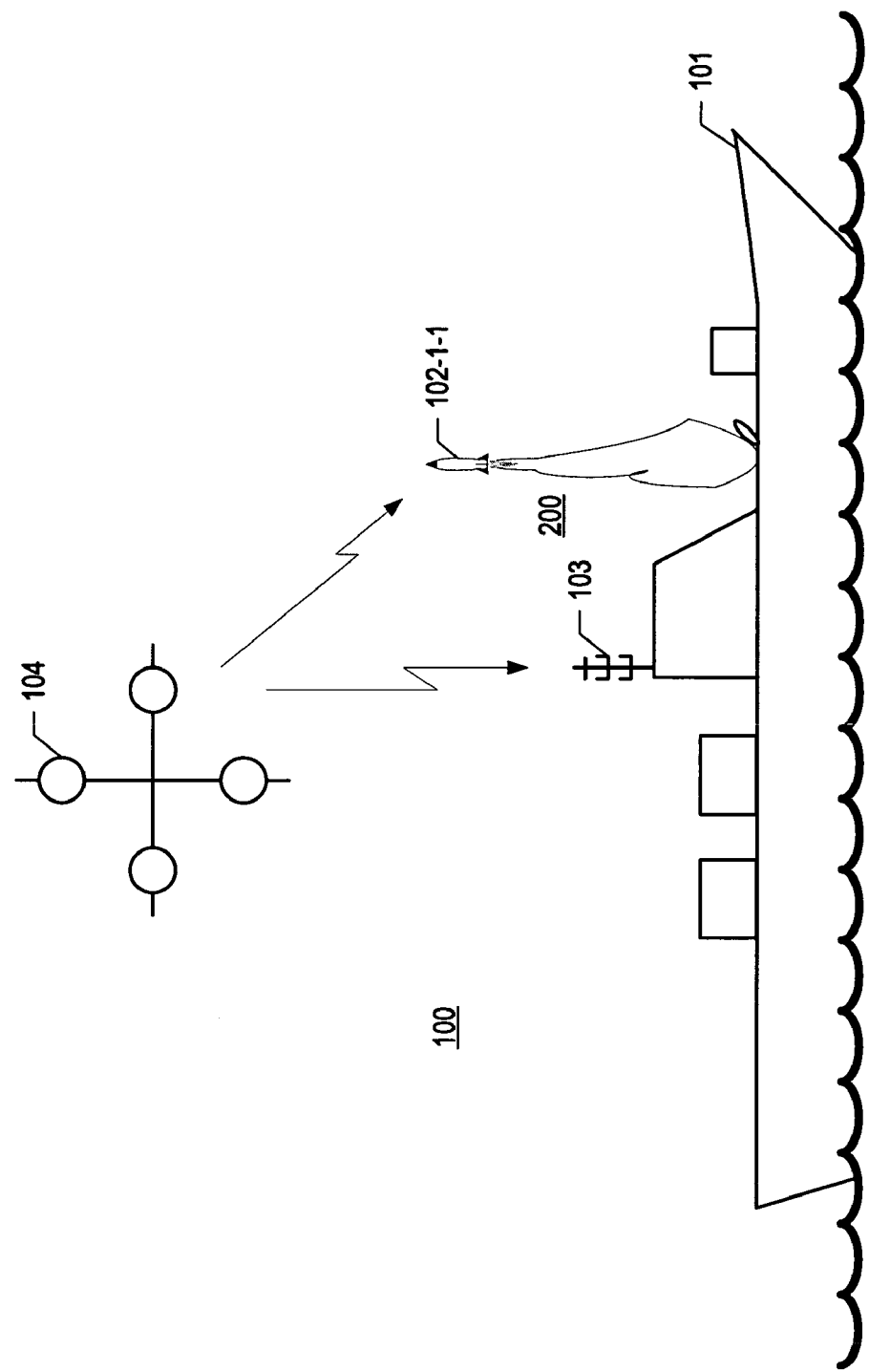
FIG. 1 depicts a schematic diagram of missile platform 100, in accordance with the illustrative embodiment of the present invention.

FIG. 1 depicts a schematic diagram of the salient components of missile platform 100, in accordance with the illustrative embodiment of the present invention. Missile platform 100 comprises missile cruiser 101, Global-Positioning-System satellite constellation 104, and weapons control system 200 (not shown in FIG. 1), which itself comprises missile 102-1-1 and Global-Positioning-System antenna 103.

Missile cruiser 101 is a ship that is used to transport, arm, and launch missiles from a location at sea. Except for those portions of weapons control system 200 described below, it will be clear to those skilled in the art how to make and use missile cruiser 101.

Missile 102-1-1 is one of a plurality of missiles that are transported, armed, and launched by missile cruiser 101. Missile 102-1-1 is described in detail below and with respect to FIGS. 2 through 8.

Global-Positioning-System antenna 103 is used to receive signals from satellite constellation 104 in well-known fashion. It will be clear to those skilled in the art how to make and use Global-Positioning-System antenna 103.

Satellite constellation 104 comprises the satellites that are part of the Global-Positioning-System that transmit signals to receivers (e.g., on board ship 101, within missile 102-1-1, etc.) for the purpose of determining the position of those receivers. It will be clear to those skilled in the art how to make and use satellite constellation 104.

Figure 2:
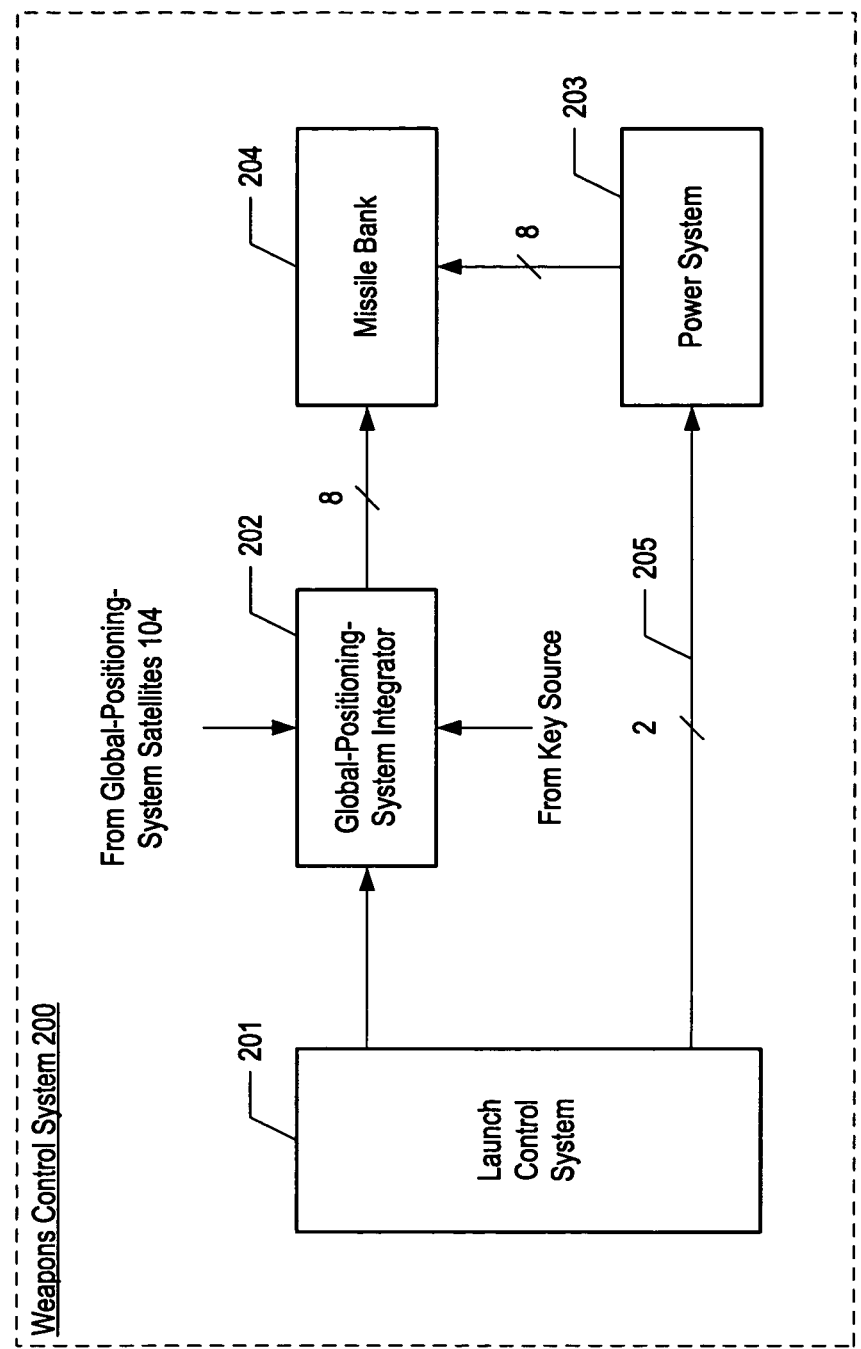
FIG. 2 depicts a block diagram of the salient components of weapons control system 200, in accordance with the illustrative embodiment of the present invention.

FIG. 2 depicts a block diagram of the salient components of weapons control system 200, in accordance with the illustrative embodiment of the present invention. Weapons control system 200 comprises launch control system 201, Global-Positioning-System Integrator 202, power system 203, and Missile Bank 204, interconnected as shown. Weapons control system 200 is used to arm and launch missiles by performing the tasks described below and with respect to FIGS. 7 and 8.

Launch control system 201 is the operator interface for weapons control system 200. Launch control system 201 translates operator commands into control signals that it transmits to Global-Positioning-System Integrator 202 and power system 203. The control signals are used to select, arm, program, and fire a specified missile or missiles (e.g., missile 102-1-1, etc.).

Global-Positioning-System integrator 202 is circuitry that accepts control signals from launch control system 201 to affect which missiles receive the "hot-start" navigational information.

Some of the information that Global-Positioning-System integrator 202 receives from Global-Positioning-System satellite constellation 104 is encrypted. To decrypt the encrypted information, Global-Positioning-System Integrator 202 uses an encryption key that it receives from a key source (not shown). Global-Positioning-System integrator 202 is described in detail below and with respect to FIGS. 3, 5, 7 and 8.

Power system 203 is a power supply that accepts control signals from launch control system 201 to affect which missiles to power (and, therefore, to accept the hot-start navigation information transmitted by Global-Positioning-System integrator 202). Power system 203 is described in detail below and with respect to FIGS. 4, 5, 7 and 8.

Missile Bank 204 is a bank of eight missiles, missiles 102-1-1 through 102-2-4. When one or more of the missiles in Missile Bank 204 receives the confluence of both power from power system 203 and hot-start navigation information from Global-Positioning-System integrator 202, then the Global-Positioning-System receiver on that missile is enabled to accept and store the hot-start navigational information. Although Missile Bank 204 has 8 missiles in the illustrative embodiment, it will be clear to those skilled in the art, after reading this specification, how to make and use alternative embodiments of the present invention that comprise any number of missiles. Missile Bank 204 is described in detail below and with respect to FIG. 5.

Figure 3:
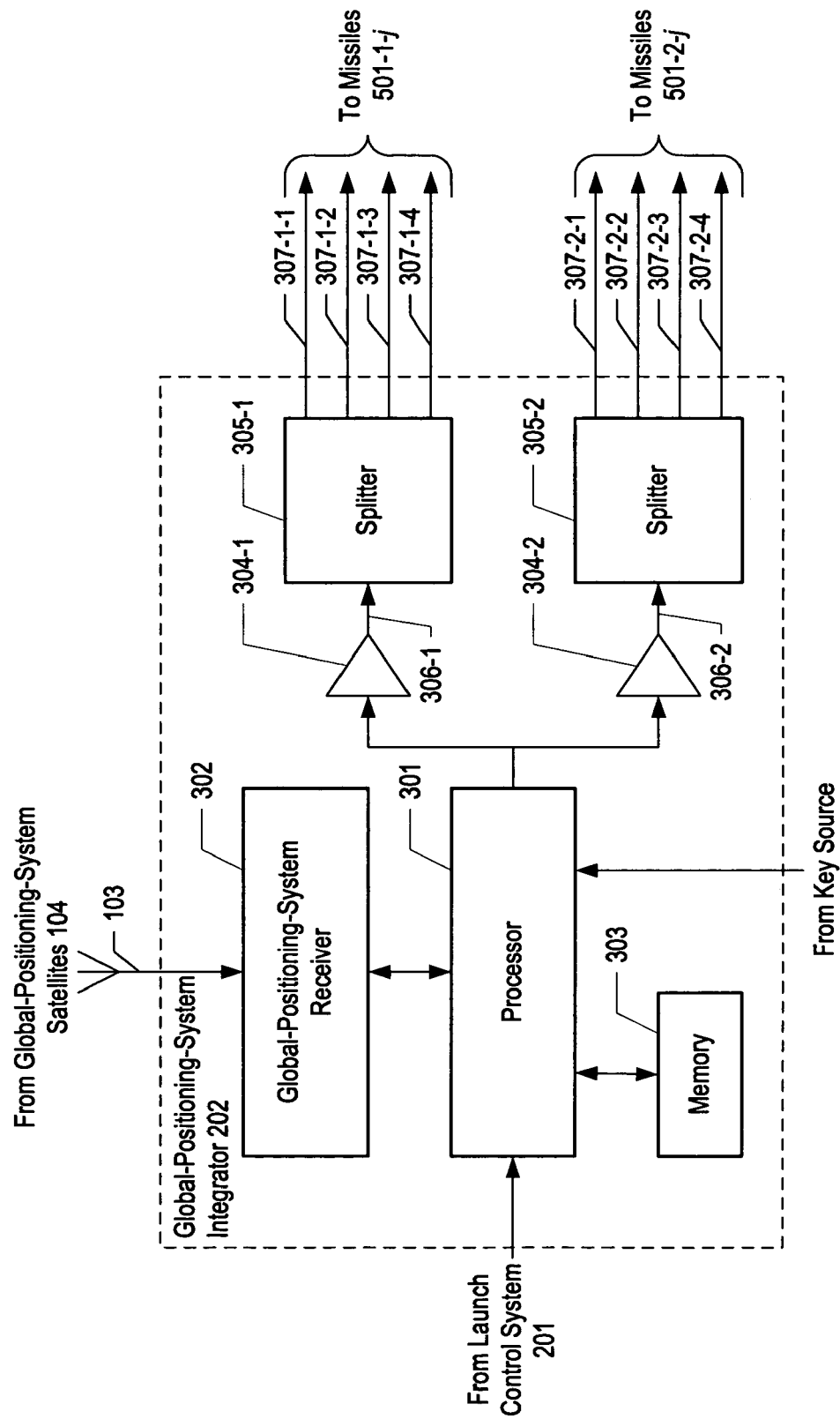
FIG. 3 depicts a block diagram of the salient components of Global-Positioning-System Integrator 202, in accordance with the illustrative embodiment of the present invention.

FIG. 3 depicts a block diagram of the salient components of Global-Positioning-System Integrator 202, in accordance with the illustrative embodiment of the present invention. Global-Positioning-System Integrator 202 comprises processor 301, Global-Positioning-System receiver 302, memory 303, transmitters 304-1 and 304-2, splitters 305-1 and 305-2, optical fibers 306-1 and 306-2, optical fibers 307-1-1 through 307-1-4, and optical fibers 307-2-1 through 307-2-4, interconnected as shown.

Processor 301 is a general-purpose processor that is capable of receiving control signals from launch control system 201, of receiving a black cryptographic key from a red cryptographic key source, of reading data from and writing data to Global-Positioning-System receiver 302, of reading data from and writing data into memory 303, and of transferring to transmitters 304-1 and 304-2 (i) the black cryptographic key and (ii) one or more characteristics (e.g., Doppler shift estimate, PRN code synchronization estimate, modulation bit sequence, etc.) of a signal from a Global-Positioning-System satellite of satellite constellation 104. U.S. Pat. No. 6,281,837 by R. E. Richton and G. Vannucci is incorporated by reference and teaches how to determine the characteristics of a signal from a Global-Positioning-System satellite of satellite constellation 104.

In some alternative embodiments of the present invention, processor 301 is be a special-purpose processor. In either case, it will be clear to those skilled in the art, after reading this disclosure, how to make and use processor 301.

Processor 301 receives in well-known fashion (e.g., via a data transfer device [DTD] interface, etc.) a black cryptographic key from which a red cryptographic key is derivable. In accordance with the illustrative embodiment, the black cryptographic key is encrypted with a public key cryptosystem, as is well known in the art. Processor 301 then transfers the black cryptographic key to Global-Positioning-System receiver 302.

Global-Positioning-System receiver 302 receives a signal from one or more Global-Positioning-System satellites in satellite constellation 104, in well-known fashion.

Global-Positioning-System receiver 302 also receives the black cryptographic key comprising the red cryptographic key from processor 301. Global-Positioning-System receiver 302 decrypts the red cryptographic key from the black cryptographic key, in well-known fashion, and then uses it to derive one or more characteristics of the received signal as described in U.S. Pat. No. 6,281,837. It will be clear to those skilled in the art, after reading this disclosure, how to make and use receiver 302.

Memory 303 is a volatile dynamic random-access memory (DRAM) that stores the hot-start navigational information, in well-known fashion, and the black cryptographic key that comprises the red cryptographic key. Periodically or sporadically, processor 301 zeroes out the specific location in memory 303 in which the black cryptographic key has been stored. It will be clear to those skilled in the art, after reading this disclosure, how to make and use memory 303.

Transmitter 304-$i$, wherein $i$ is selected from the set $\{1, 2\}$, transmits the hot-start navigational information to splitter 305-$i$ via optical fiber 306-$i$. Although there are two transmitters in the illustrative embodiment, it will be clear to those skilled in the art, after reading this specification, how to make and use alternative embodiments of the present invention that comprise any number of transmitters. It will be clear to those skilled in the art, after reading this specification, how to make and use embodiments of the present invention that have any number of transmitters and splitters.

The hot-start navigational information comprises:

Global-Positioning-System almanac, ephemerides, and complementary navigation [COMPNAV] for the satellites which a missile might be able to view during its flight, and the time-mark strobe and the time-mark data, which describes where in time the time-mark strobe occurs, and the black cryptographic key that comprises the red cryptographic key, which red cryptographic key enables the Global-Positioning-System receiver to decode P(Y) signals.

The almanac and ephemeredes information described in U.S. Pat. No. 6,114,991, which is incorporated by reference. It will be clear to those skilled in the art, after reading this specification, how to make and use transmitter 304-$i$.

Splitter 305-$i$ is an optical splitter that replicates and distributes the hot-start navigational information received from transmitter 304-$i$. In accordance with the illustrative embodiment, splitter 305-$i$ distributes the hot-start navigational information to four missiles in missile bank 204. Although there are two splitters in the illustrative embodiment, it will be clear to those skilled in the art, after reading this specification, how to make and use alternative embodiments of the present invention that comprise any number of splitters. Furthermore, although the splitters in the illustrative embodiment have a 1-to4 fan out, it will be clear to those skilled in the art, after reading this specification, how to make and use alternative embodiments of the present invention that comprise splitters of any fan out. It will be clear to those skilled in the art how to make and use splitter 305-$i$.

Figure 4:
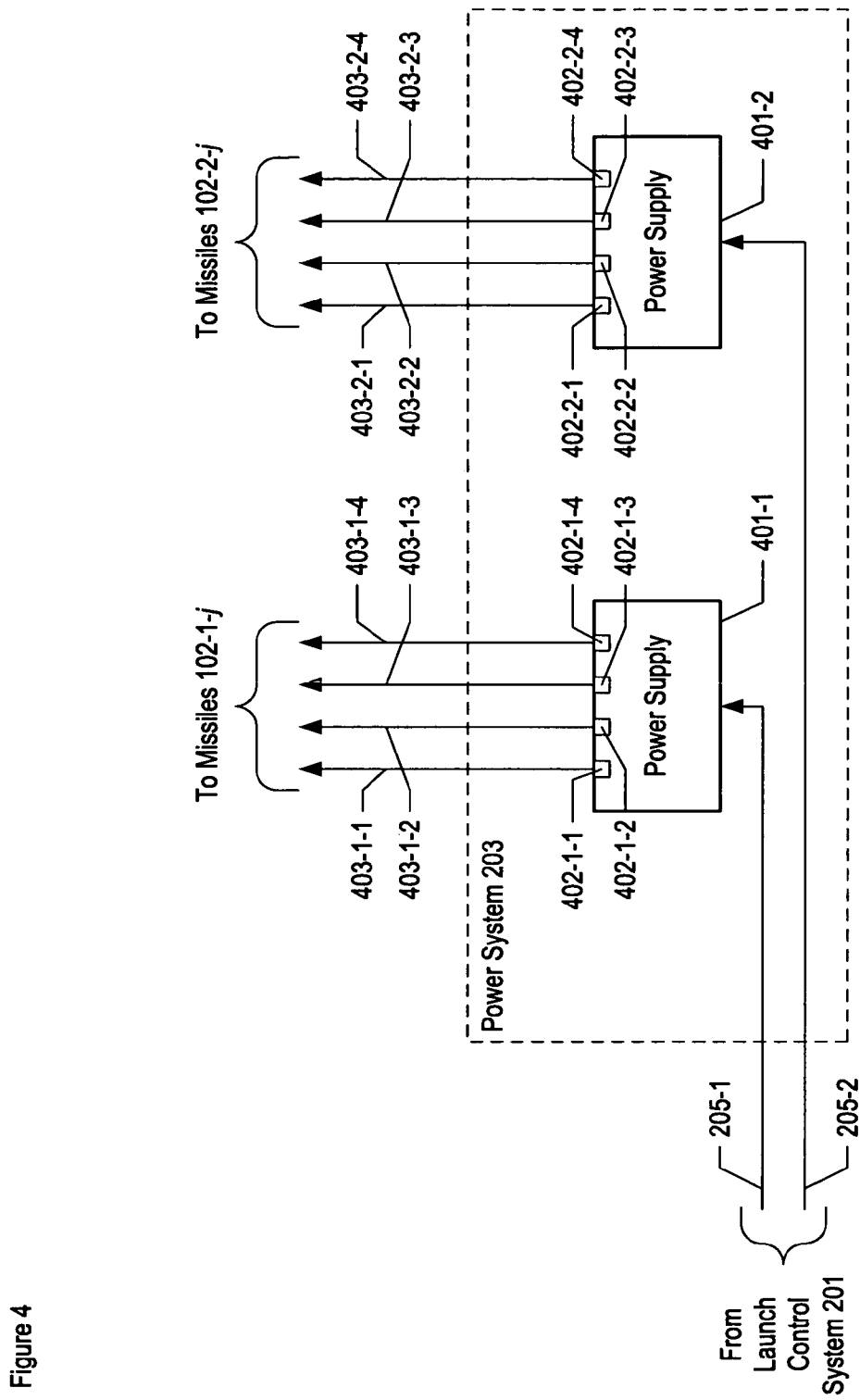
FIG. 4 depicts a block diagram of the salient components of power system 203, in accordance with the illustrative embodiment of the present invention.

FIG. 4 depicts a block diagram of the salient components of power system 203. Power system 203 comprises power supply 401-1 and 401-2, interrelated as shown. In some alternative embodiments of the present invention, any number of power supplies can be used.

Power supply 401-$i$ comprises output terminals 402-$i$-1 through 402-$i$-4. Although the power supplies in the illustrative embodiment each have four output terminals, it will be clear to those skilled in the art, after reading this specification, how to make and use alternative embodiments of the present invention that comprise power supplies with any number of output terminals.

Power supply 401-$i$ uses the control signals received from launch control system 201 on bus 205 to determine to which output terminal should power be supplied (i.e., should be energized). Power supply 401-$i$ is capable of energizing one or more of output terminals 402-$i$-1 through 402-$i$-$j$. Furthermore, power supply 401-$i$ is capable of energizing output terminals 402-$i$-1 through 402-$i$-$j$ independently of each other. It will be clear to those skilled in the art, after reading this specification, how to make and use power supply 401-$i$.

Figure 5:
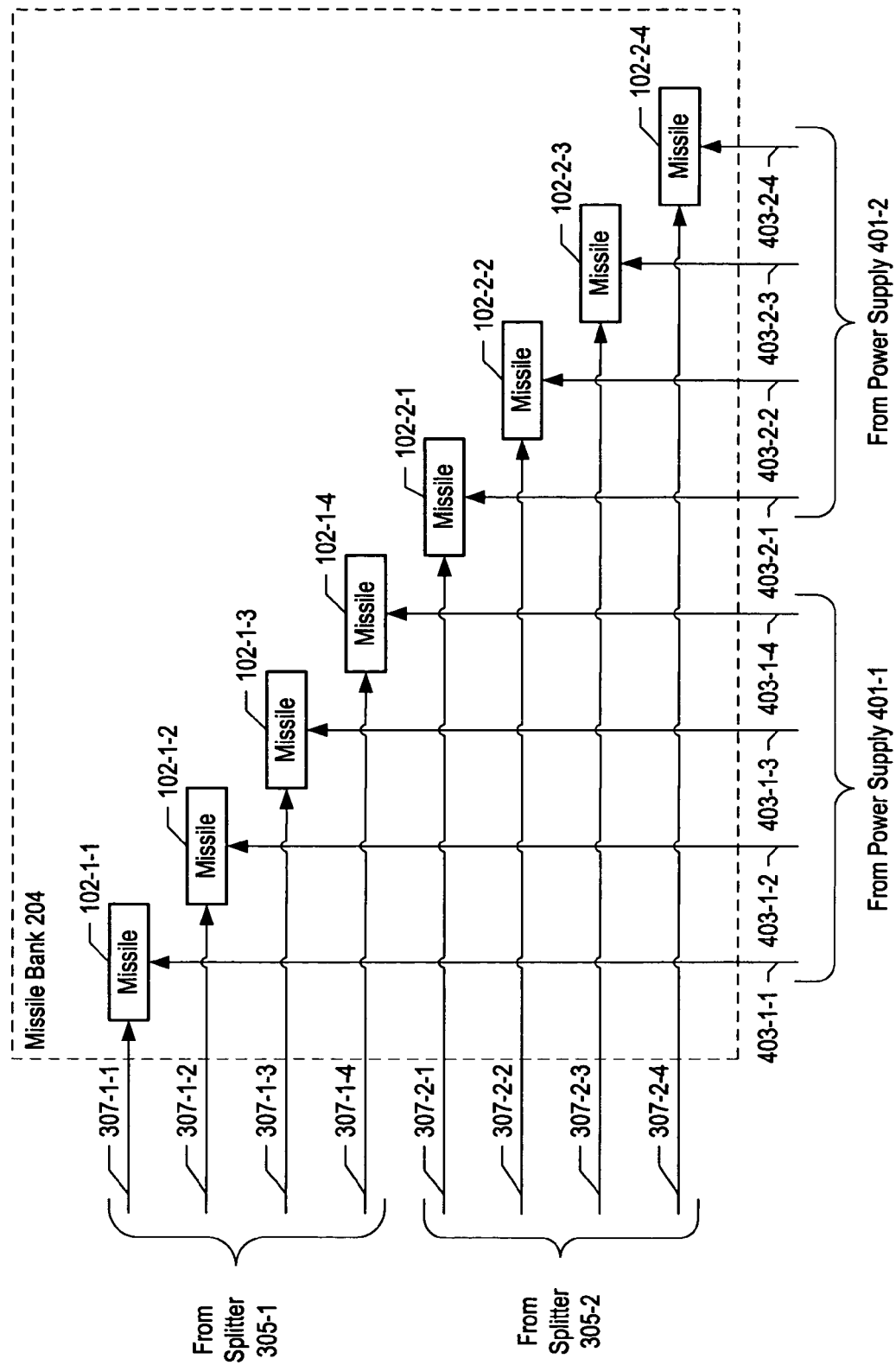
FIG. 5 depicts a block diagram of the salient components of Missile Bank 204, in accordance with the illustrative embodiment of the present invention.

FIG. 5 depicts Missile Bank 204, in accordance with the illustrative embodiment of the present invention. Missile Bank 204 comprises eight (8) missiles 102-1-1 through 102-2-4.

As can be seen in FIG. 5, the hot-start navigational information arriving from splitter 305-1 is received by missiles 102-1-1 through 102-1-$j$. Similarly, the distributed hot-start navigational information arriving from splitter 305-2 is received by missiles 102-2-1 through 102-2-$j$. Furthermore, the energizing signal associated with output terminal 402-$i$-$j$ of power supply 401-$i$ powers missile 102-$i$-$j$.

Figure 6:
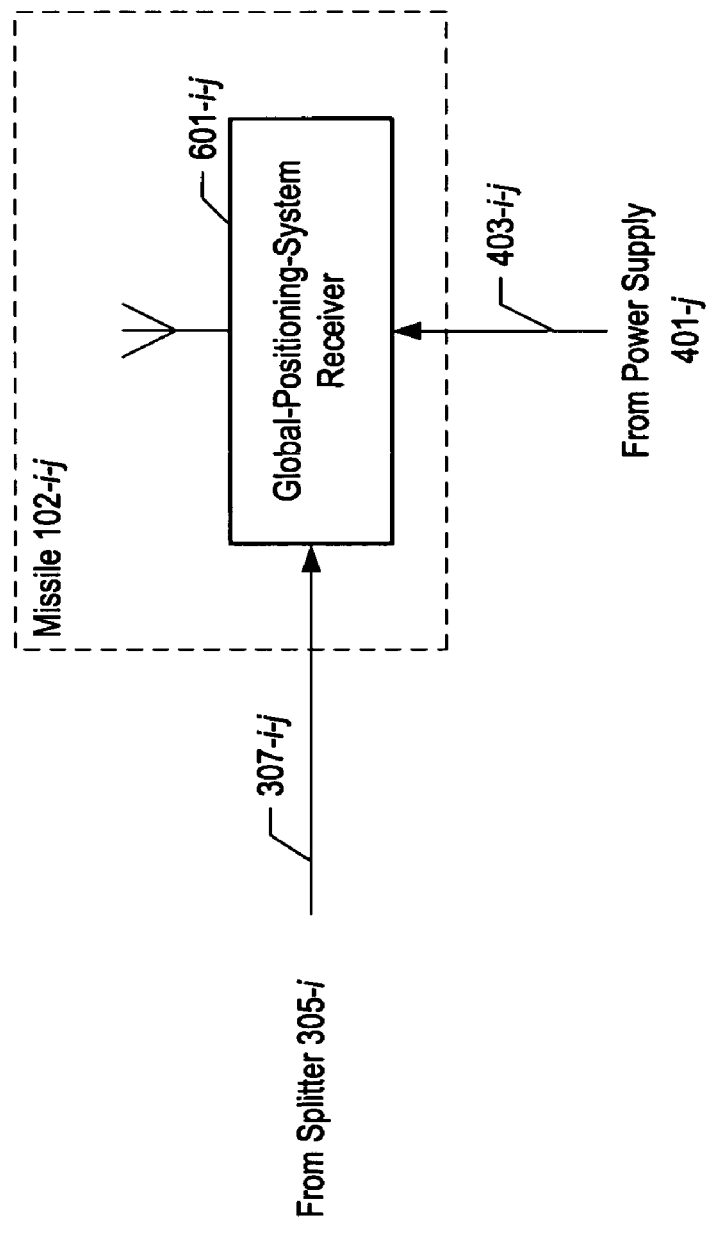
FIG. 6 depicts a block diagram of the salient components of missile 102-$i$-$j$, in accordance with the illustrative embodiment of the present invention.

FIG. 6 depicts a block diagram of the salient components of missile 102-$i$-$j$, in accordance with the illustrative embodiment of the present invention.

Missile 102-$i$-$j$ comprises Global-Positioning-System receiver 601-$i$-$j$, as is well-known in the art, to monitor and control its flight path to an intended target Global-Positioning-System receiver 601-$i$-$j$ receives the hot-start navigational information from splitter 305-$i$.

Receiver 601-$i$-$j$ is specifically "addressed" by launch control system 201 when it is energized by power supply 401-$i$ through output terminal 402-$i$-$j$. Once receiver 601-$i$-$j$ is "addressed," it accepts—in contrast to merely receives—the hot-start navigational information from splitter 305-$i$. In fact, only if receiver 601-$i$-$j$ is energized does it accept the hot-start navigational information from processor 301.

Receiver 601-$i$-$j$ also receives a signal in well-known fashion from one or more of the satellites in satellite constellation 104. Once receiver 601-$i$-$j$ accepts the hot-start navigational information, it reads in, as part of the hot-start navigational information from Global-Positioning-System Integrator 202, (i) the characteristic from a Global-Positioning-System satellite and (ii) the black cryptographic key comprising the red cryptographic key. Receiver 601-$i$-$j$ decrypts the red cryptographic key from the black cryptographic key in well-known fashion. Receiver 601-$i$-$j$ then uses the characteristic and red cryptographic key to acquire one or more Global-Positioning-System satellites, and subsequently to determine its position.

It will be clear to those skilled in the art, after reading this disclosure, how to make and use receiver 601-$i$-$j$.

Figure 7:
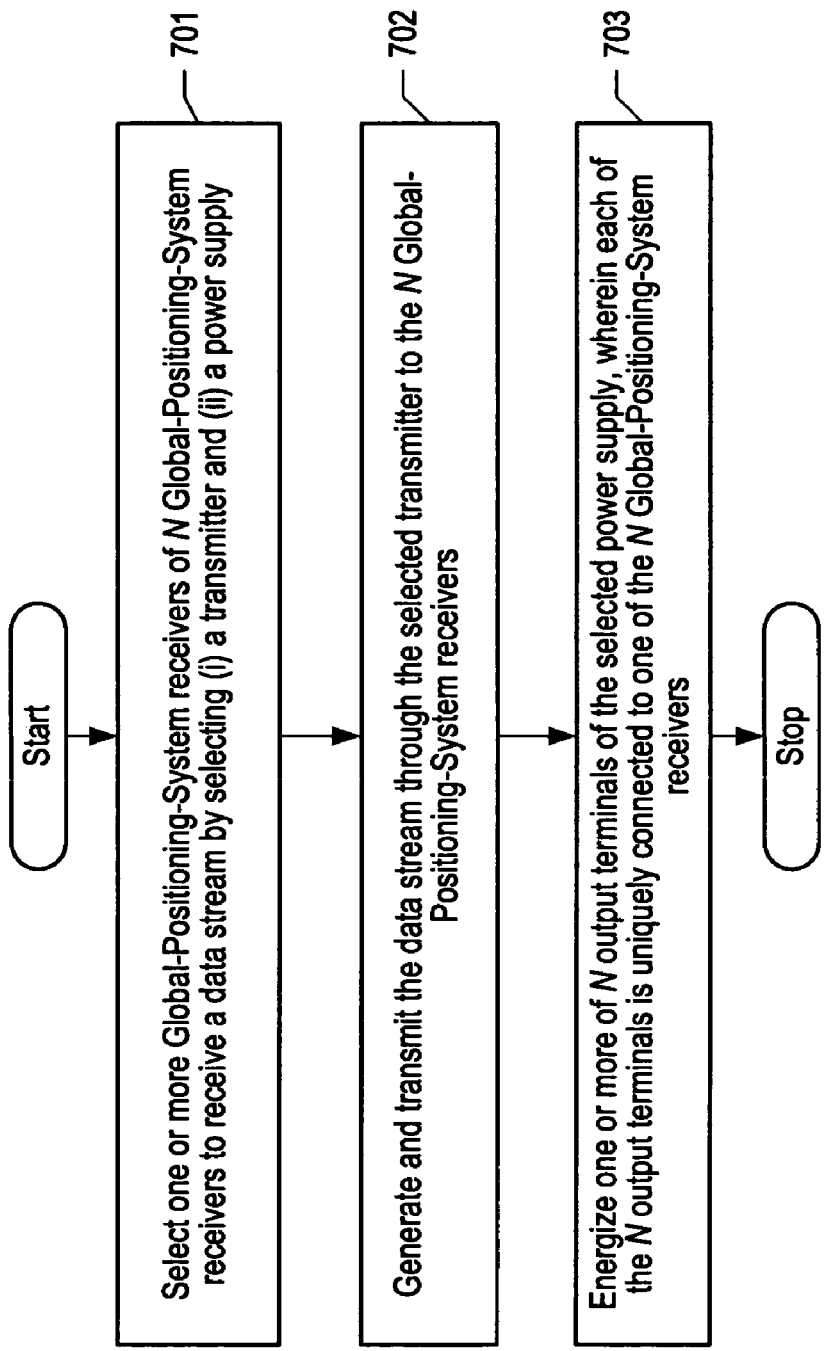
FIG. 7 depicts a flowchart of the salient tasks of weapons control system 200, in accordance with the illustrative embodiment of the present invention.

FIG. 7 depicts a flowchart of the salient tasks performed by weapons control system 200 in accordance with the illustrative embodiment of the present invention. It will be clear to those skilled in the art which tasks depicted in FIG. 7 can be performed simultaneously or in a different order than that depicted.

At task 701, weapons control system 200 selects a missile (and its associated Global-Positioning-System receiver) to receive and accept the hot-start navigational information from processor 301. To accomplish this, system 200 (i) selects the transmitter (of transmitters 304-1 and 304-2) associated with the missile and (ii) selects the power supply (of power supplies 401-1 and 401-2) and the terminal (of terminals 401-$i$-$j$) associated with the selected missile. It will be clear to those skilled in the art, after reading this specification, how to perform task 701.

At task 702, weapons control system 200 generates the hot-start navigational information and transmits the hot-start navigational information through selected the transmitter(s). For example, if the selected missile is missile 201-2-1 (and, therefore, the associated Global-Positioning-System receiver receiver 601-2-1), then processor 301 transmits the generated hot-start navigational information to through transmitter 304-2. Task 702 is described in detail below and with respect to FIG. 8.

At task 703, weapons control system 200 directs the selected power supply to energize the output associated with the selected missile. For example, if the selected missile is missile 201-2-1, then weapons control system 200 directs power supply 401-2 to energize output terminal 402-2-1. The effect of energizing output terminal 402-2-1 is that that receiver 601-2-1 (within missile 102-$i$-$j$) is powered and consequently can accept the hot-start navigational information on optical fiber 307-2-1. It will be clear to those skilled in the art how to perform task 703.

Figure 8:
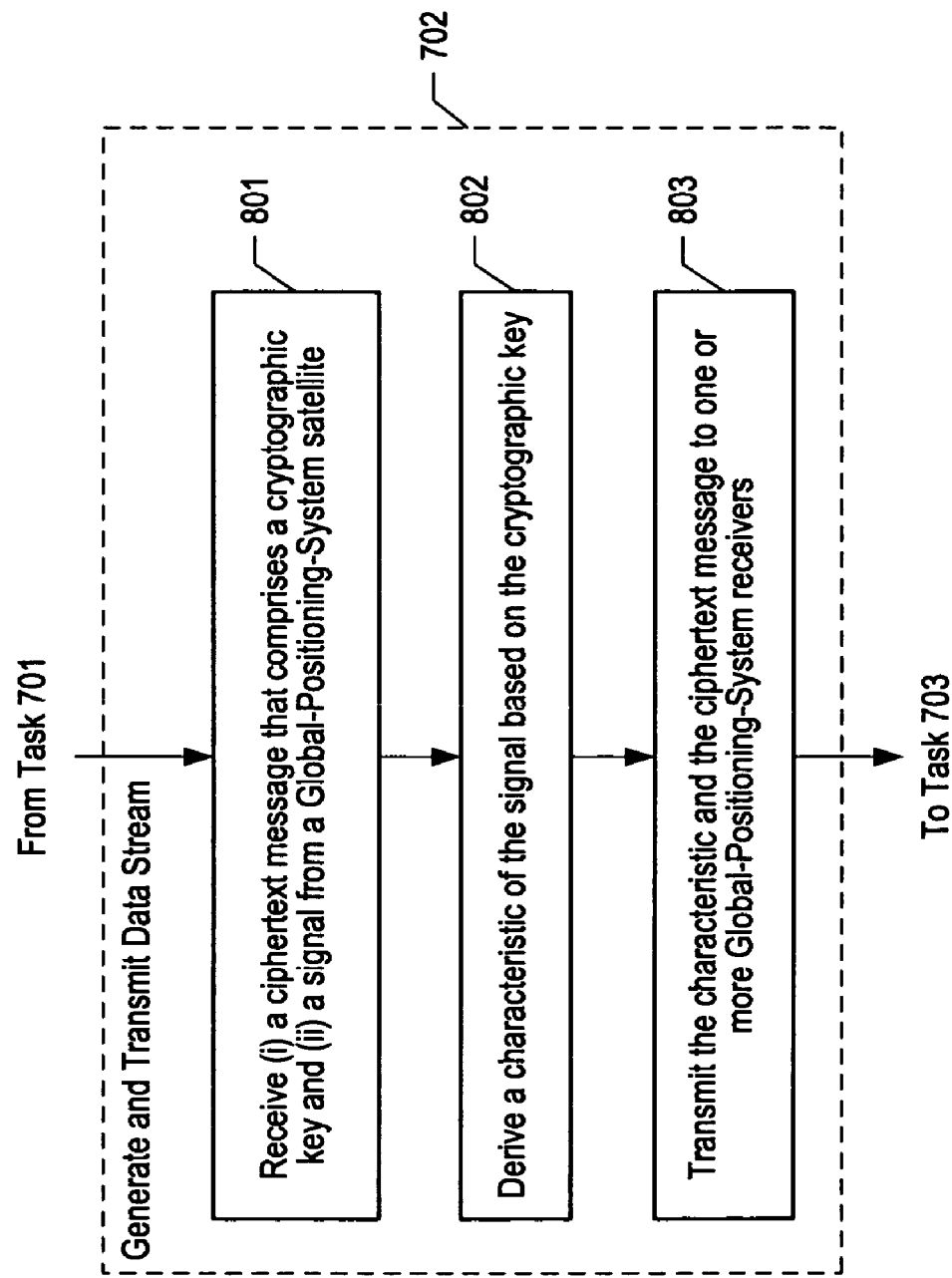
FIG. 8 depicts a flowchart of task 702, in accordance with the illustrative embodiment of the present invention.

FIG. 8 depicts a flowchart of the salient subtasks associated with task 702, in accordance with the illustrative embodiment of the present invention. It will be clear to those skilled in the art which tasks depicted in FIG. 8 can be performed simultaneously or in a different order than that depicted.

At subtask 801, Global-Positioning-System Integrator 202 receives a black cryptographic key from which a red cryptographic key is derivable. Global-Positioning-System Integrator 202 also receives a signal from a Global-Positioning-System satellite in satellite constellation 104.

At subtask 802, Global-Positioning-System Integrator 202 derives a characteristic of the signal by using the red cryptographic key.

At subtask 803, Global-Positioning-System Integrator 202 transmits, via transmitter 304-$i$ and splitter 305-$i$, (i) the characteristic of the signal and (ii) the black cryptographic key to Global-Positioning-System receiver 601-$i$-$j$.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
    a transmitter for transmitting a hot-start navigation information to j Global-Positioning-System receivers, wherein j is a positive integer greater than 1; and
    a power supply comprising j output terminals, wherein (i) each of said j output terminals is uniquely connected to one of said j Global-Positioning-System receivers and (ii) each of said j output terminals is energized independently of each other.

2. The apparatus of claim 1 wherein said hot-start navigation information comprises a characteristic of a signal from a Global-Positioning-System satellite.

3. The apparatus of claim 2 wherein said characteristic comprises a PRN code synchronization estimate.

4. The apparatus of claim 1 wherein the transmission of said hot-start navigation information to said j Global-Positioning-System receivers is optical and further comprising an optical splitter for distributing said hot-start navigation information to said j Global-Positioning-System receivers.

5. The apparatus of claim 4 further comprising an optical fiber for conveying said hot-start navigation information from said transmitter to said splitter.

6. The apparatus of claim 1 wherein said hot-start navigation information further comprises a black cryptographic key from which a red cryptographic key is derivable.

7. A method comprising:
    transmitting a hot-start navigation information to j Global-Positioning-System receivers, wherein j is a positive integer greater than 1; and
    energizing one or more of j output terminals of a power supply, wherein (i) each of said j output terminals is uniquely connected to one of said j Global-Positioning-System receivers and (ii) each of said j output terminals is energized independently of each other.

8. The method of claim 7 wherein said hot-start navigation information comprises a characteristic of a signal from a Global-Positioning-System satellite.

9. The method of claim 8 wherein said characteristic comprises a PRN code synchronization estimate.

10. The method of claim 7 wherein the transmitting of said hot-start navigation information is optical.

11. The method of claim 7 wherein said hot-start navigation information further comprises a black cryptographic key from which a red cryptographic key is derivable.

12. An apparatus comprising:
    a transmitter for transmitting a hot-start navigation information to j Global-Positioning-System receivers, wherein j is a positive integer greater than 1;
    a power supply comprising j output terminals, wherein (i) each of said j output terminals is uniquely connected to one of said j Global-Positioning-System receivers and (ii) each of said j output terminals is energized independently of each other; and
    a controller for selecting one or more of j Global-Positioning-System receivers to receive said hot-start navigation information by selecting said transmitter from a plurality of transmitters and said power supply from a plurality of power supplies.

13. The apparatus of claim 12 wherein said hot-start navigation information comprises a characteristic of a signal from a Global-Positioning-System satellite.

14. The apparatus of claim 12 wherein the transmission of said hot-start navigation information to said j Global-Positioning-System receivers is optical and further comprising an optical splitter for distributing said hot-start navigation information to said j Global-Positioning-System receivers.

15. The apparatus of claim 14 further comprising an optical fiber for conveying said hot-start navigation information from said transmitter to said splitter.

16. The apparatus of claim 12 wherein said hot-start navigation information further comprises a black cryptographic key from which a red cryptographic key is derivable.

17. A method comprising:
    selecting one or more of j Global-Positioning-System receivers to receive a hot-start navigation information by selecting a transmitter from a plurality of transmitters and a power supply from a plurality of power supplies, wherein j is a positive integer greater than 1;
    transmitting from said selected transmitter said hot-start navigation information to said j Global-Positioning-System receivers; and
    energizing one or more of j output terminals of said selected power supply, wherein (i) each of said j output terminals is uniquely connected to one of said j Global- Positioning-System receivers and (ii) each of said j output terminals is energized independently of each other.

18. The method of claim 17 wherein said hot-start navigation information comprises a characteristic of a signal from a Global-Positioning-System satellite.

19. The method of claim 17 wherein the transmitting of said hot-start navigation information is optical.

20. The method of claim 17 wherein said hot-start navigation information further comprises a black cryptographic key from which a red cryptographic key is derivable.

21. An apparatus comprising:
a transmitter for transmitting a hot-start navigation information to j Global-Positioning-System receivers, wherein j is a positive integer greater than 1; and
a power supply for selectively energizing one or more of said j Global-Positioning-System receivers;
wherein only said energized Global-Positioning-System receivers accept said hot-start navigation information.

22. The apparatus of claim 21 wherein said hot-start navigation information comprises a characteristic of a signal from a Global-Positioning-System satellite.

23. The apparatus of claim 21 wherein the transmission of said hot-start navigation information to j Global-Positioning-System receivers is optical and further comprising an optical splitter for distributing said hot-start navigation information to said j Global-Positioning-System receivers.

24. The apparatus of claim 21 wherein said hot-start navigation information further comprises a black cryptographic key from which a red cryptographic key is derivable.

* * * * *